(12) United States Patent
Wang et al.

(10) Patent No.: US 12,519,349 B2
(45) Date of Patent: Jan. 6, 2026

(54) BRUSHLESS MOTOR WITH SELF-COOLING STRUCTURE

(71) Applicant: Hobbywing Electro-Mechanics Co., ltd., Guangdong (CN)

(72) Inventors: Qingyang Wang, Guangdong (CN); Qiao Lin, Guangdong (CN); Zhipeng Ji, Guangdong (CN); Youhui Liu, Guangdong (CN)

(73) Assignee: Hobbywing Electro-Mechanics Co., ltd., Guangdong (CN)

( * ) Notice: Subject to any disclaimer, the term of this patent is extended or adjusted under 35 U.S.C. 154(b) by 110 days.

(21) Appl. No.: 18/737,317

(22) Filed: Jun. 7, 2024

(65) Prior Publication Data

US 2025/0132615 A1 Apr. 24, 2025

Related U.S. Application Data

(63) Continuation of application No. PCT/CN2024/087547, filed on Apr. 12, 2024.

(30) Foreign Application Priority Data

Oct. 20, 2023 (CN) .......................... 202311362328.3

(51) Int. Cl.
*H02K 1/18* (2006.01)
*H02K 1/20* (2006.01)
(Continued)

(52) U.S. Cl.
CPC ................. *H02K 1/18* (2013.01); *H02K 1/20* (2013.01); *H02K 1/2706* (2013.01); *H02K 11/30* (2016.01);
(Continued)

(58) Field of Classification Search
CPC .......... H02K 1/18; H02K 1/20; H02K 1/2706; H02K 11/30; H02K 11/33; H02K 2203/03; H02K 2211/03; H02K 5/207; H02K 9/06
See application file for complete search history.

(56) References Cited

U.S. PATENT DOCUMENTS

2017/0288505 A1 10/2017 Ionele

FOREIGN PATENT DOCUMENTS

| CN | 108321959 A | 7/2018 |
| CN | 208386304 A | 1/2019 |

(Continued)

*Primary Examiner* — Christopher M Koehler
*Assistant Examiner* — Ethan Nguyen Vo
(74) *Attorney, Agent, or Firm* — IPro, PLLC; Na Xu (57) ABSTRACT

An example includes a housing, a stator assembly, a rotor, and a self-cooling structure. The stator assembly is mounted on the housing and fitted around the rotor, the rotor is rotatably housed within the housing, the self-cooling structure is attached to the rotor, and the self-cooling structure is located at the stator assembly. The self-cooling structure comprises an outer cylinder, an inner cylinder, and a plurality of blades, wherein the plurality of blades are radially connected between the inner cylinder and the outer cylinder. A ventilation slot is formed between the outer cylinder and the inner cylinder, with multiple end-face air intake holes formed at the ventilation slot, and side exhaust holes are formed between adjacent two blades, with the end-face air intake holes being in communication with the side exhaust holes. In this way, it is capable of actively dissipating heat within the motor without altering its form.

5 Claims, 8 Drawing Sheets (51) Int. Cl.
*H02K 1/2706* (2022.01)
*H02K 11/30* (2016.01)
(52) U.S. Cl.
CPC ...... *H02K 2203/03* (2013.01); *H02K 2211/03* (2013.01)

(56) References Cited

FOREIGN PATENT DOCUMENTS

| | | | |
|---|---|---|---|
| CN | 110635624 | A | 12/2019 |
| CN | 112383174 | A | 2/2021 |
| CN | 216489940 | U | 5/2022 |
| CN | 117097077 | A | 11/2023 |
| GB | 334456 | A | 9/1930 |
| JP | H05300700 | A | 11/1993 |
| JP | 2001078390 | A | 3/2001 |
| KR | 101689591 | B1 | 12/2016 |
| WO | 2020186805 | A1 | 9/2020 |

BRUSHLESS MOTOR WITH SELF-COOLING STRUCTURE

CROSS-REFERENCE TO RELATED APPLICATIONS

This application is a continuation of International Patent Application NO. PCT/CN2024/087547, field on Apr. 12, 2024, the entire contents of which are incorporated herein by reference.

TECHNICAL FIELD

The present disclosure relates to the technical field of tool, and more particularly to a brushless motor with self-cooling structure.

BACKGROUND

With the development of society, the technology of brushless motors has become increasingly mature and has been widely applied in various fields such as model aircraft, medical equipment, household appliances, and electric vehicles. As application scenarios are trending towards high power and high torque, the requirements for brushless motors are also becoming higher, which in turn sets higher demands for the motor's own heat dissipation performance. High temperatures are prone to cause damage to the motor itself (affecting bearing life, motor performance, etc.). From the perspective of motor application and lifespan, the lower the motor's temperature under reasonable load conditions, the better. Currently, it has become a challenge to reduce the motor's temperature using a low-cost method without changing the original electrical form.

The Chinese patent with the publication number "CN103219833B" has disclosed a "motor cooling structure", which includes: a motor housing, heat dissipation fins, a heat pipe, and an auxiliary cooling device. The first end of the heat pipe is installed on the outer surface of the motor housing, the second end of the heat pipe extends to the tail end of the motor housing, and the second end of the heat pipe is equipped with the auxiliary cooling device, with a number of heat dissipation fins enveloping the outer surface of the motor housing. This "motor cooling structure" guides the thermal energy on the motor housing to the tail end of the motor through the heat pipe, and then expands the heat dissipation area through heat dissipation fins.

SUMMARY

Example embodiments of the present disclosure disclose a brushless motor with a self-cooling structure. The brushless motor with a self-cooling structure includes a housing, a stator assembly, a rotor, and a self-cooling structure, wherein the stator assembly is mounted on the housing, the stator assembly is fitted around the rotor, and the rotor is rotatably housed within the housing, the self-cooling structure is attached to the rotor, and the self-cooling structure is located at one end of the stator assembly. The self-cooling structure comprises an outer cylinder, an inner cylinder, and a plurality of blades, wherein the plurality of blades are radially connected between an end face of the inner cylinder and an end face of the outer cylinder, a ventilation slot is formed between the outer cylinder and the inner cylinder, with multiple end-face air intake holes formed at the bottom of the ventilation slot, and side exhaust holes are formed between adjacent two blades, with the end-face air intake holes being in communication with the side exhaust holes.

DETAILED DESCRIPTION

In order to facilitate the understanding of the present disclosure, the present disclosure will be described in more detail hereinafter with reference to the attached drawings and specific embodiments. It shall be noted that when an element is said to be "fixed" to another element, it may be directly on the other element, or there may be one or more intervening elements therebetween. When an element is said to be "connected" to another element, it may be directly connected to the other element, or there may be one or more intervening elements therebetween. Terms "vertical", "horizontal", "left", "right" and similar expressions used in this specification are for illustration purposes only.

Unless otherwise defined, all technical and scientific terms used in this specification have the same meaning as commonly understood by those skilled in the art to which the present disclosure belongs. The terms used in the specification of the present disclosure in this specification are only for the purpose of describing specific embodiments and are not intended to limit the present disclosure. The term "and/or" as used in this specification comprises any and all combinations of one or more associated items listed.

Figure 1:
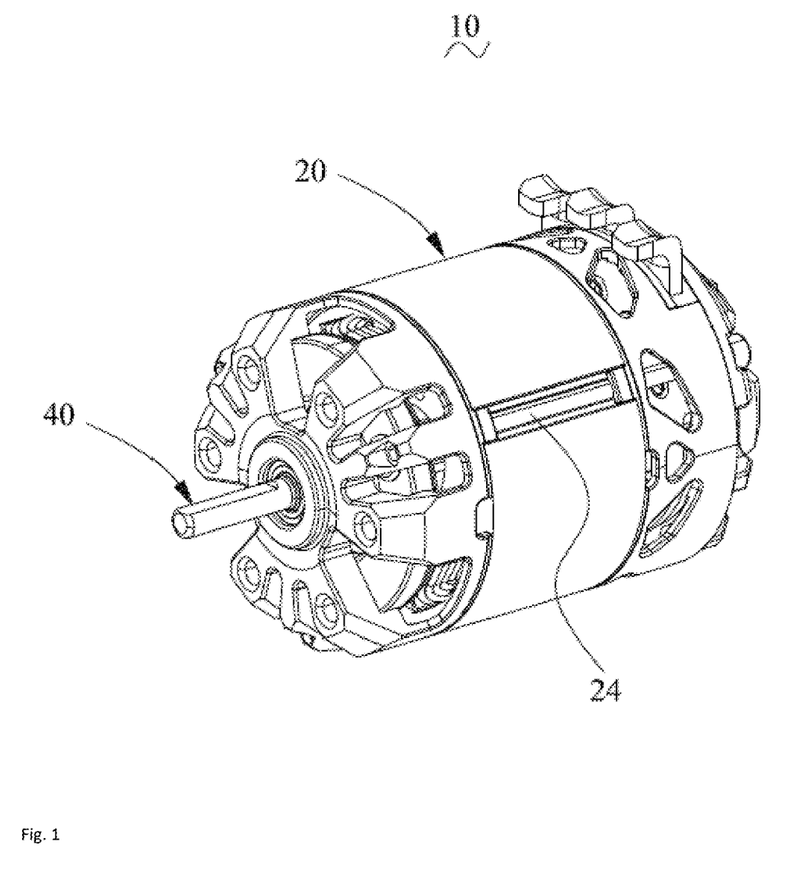
FIG. 1 is a schematic diagram of the brushless motor with a self-cooling structure according to the present disclosure.
Figure 2:
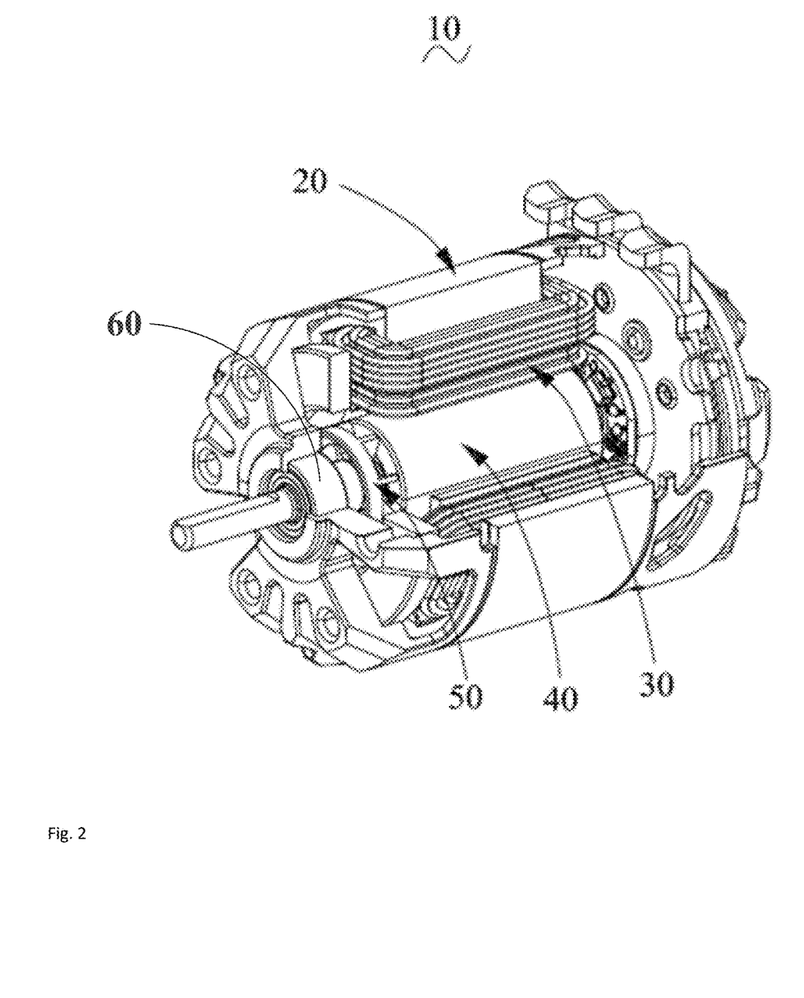
FIG. 2 is a schematic diagram of the internal structure of the brushless motor with a self-cooling structure according to the present disclosure.

The present disclosure provides a brushless motor 10 with a self-cooling structure, as depicted in FIG. 1 and FIG. 2, which comprises: a housing 20, a stator assembly 30, a rotor 40, and a self-cooling structure 50. The stator assembly 30 is mounted on the housing 20, and fitted around the rotor 40, which is rotatably housed within the housing 20. The self-cooling structure 50 is attached to the rotor 40 and located at one end of the stator assembly 30.

Figure 6:
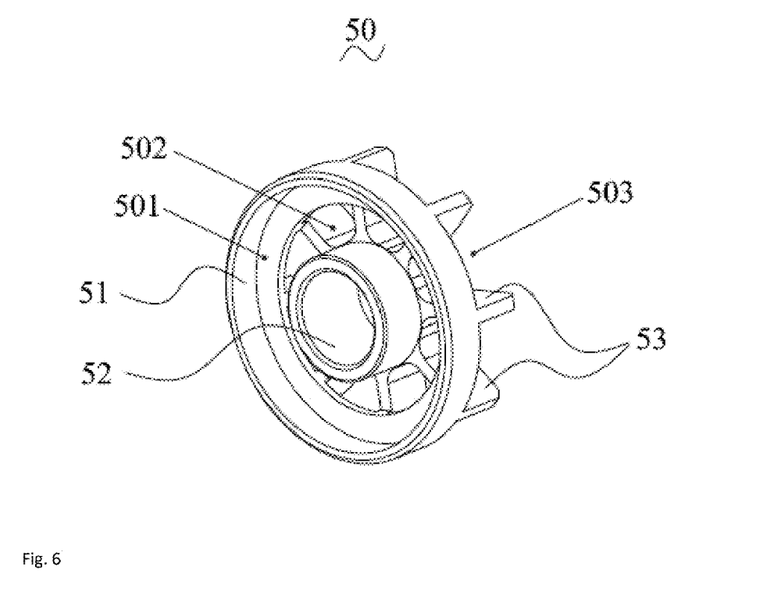
FIG. 6 is a structural schematic diagram of the self-cooling structure as shown in FIG. 4.
Figure 7:
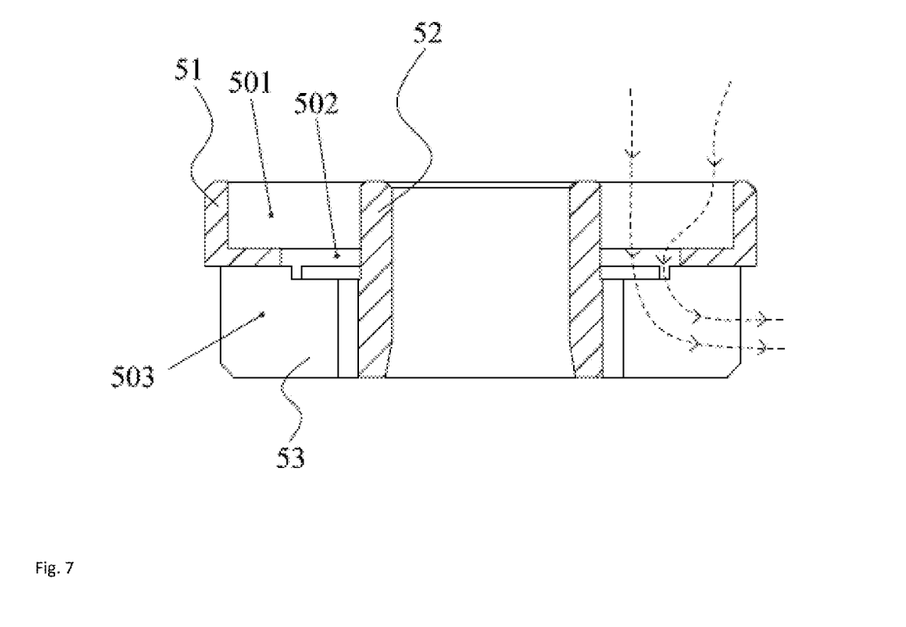
FIG. 7 is a plan view section diagram of the self-cooling structure as shown in FIG. 6.

As shown in FIG. 6 and FIG. 7, the self-cooling structure 50 includes: an outer cylinder 51, an inner cylinder 52, and several blades 53. The blades 53 are radially connected between an end face of the inner cylinder 52 and an end face of the outer cylinder 51. A ventilation slot 501 is formed between the outer cylinder 51 and the inner cylinder 52, with multiple end-face air intake holes 502 at the bottom of the ventilation slot 501. Side exhaust holes 503 are formed between adjacent blades 53, which are in communication with the end-face air intake holes 502.

During operation, the rotation of the rotor 40 drives the self-cooling structure 50 to rotate, stirring the air and accelerating its flow in the direction from the outer cylinder 51 towards the blades 53. The flowing air rapidly carries away the heat from the stator assembly 30, thereby enhancing the heat dissipation performance. The specific working principle of the self-cooling structure 50 will be explained below.

Figure 4:
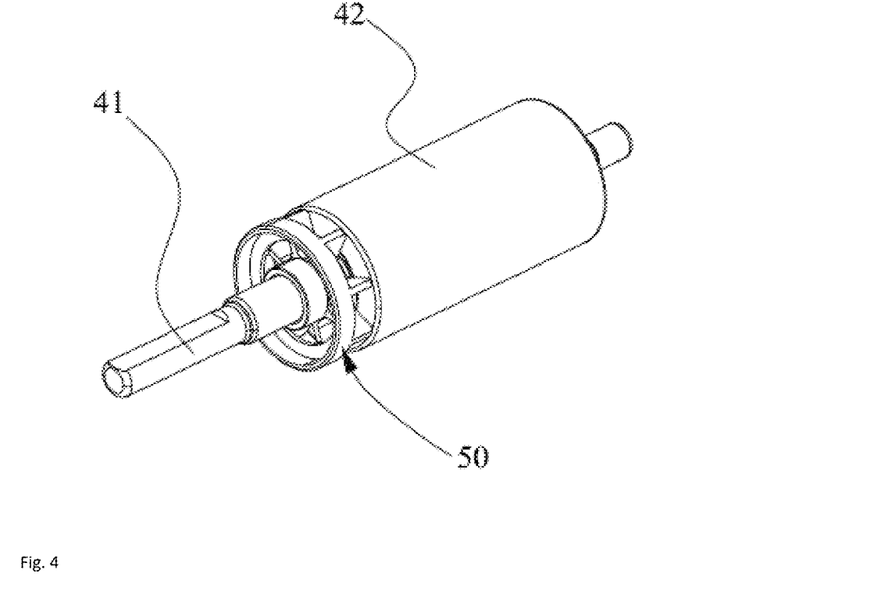
FIG. 4 is a schematic diagram of the self-cooling structure and the rotor as shown in FIG. 3.
Figure 5:
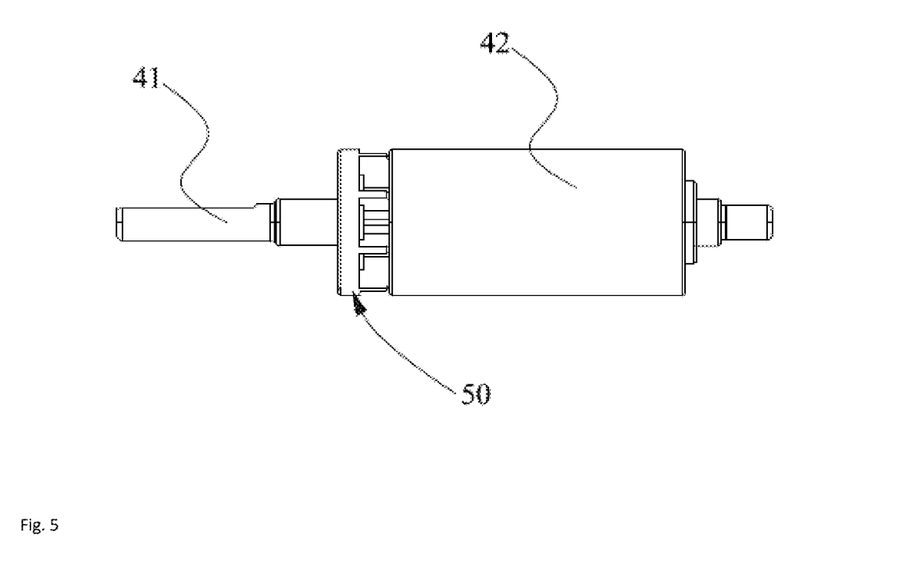
FIG. 5 is a plan view diagram of the self-cooling structure and the rotor as shown in FIG. 4.

Preferably, as shown in FIG. 4 and FIG. 5, the rotor 40 has a rotary shaft 41 and a magnetic pole induction part 42. The self-cooling structure 50 is fixedly fitted onto the rotary shaft 41, with its blades 53 in contact with the end face of the magnetic pole induction part 42.

Figure 3:
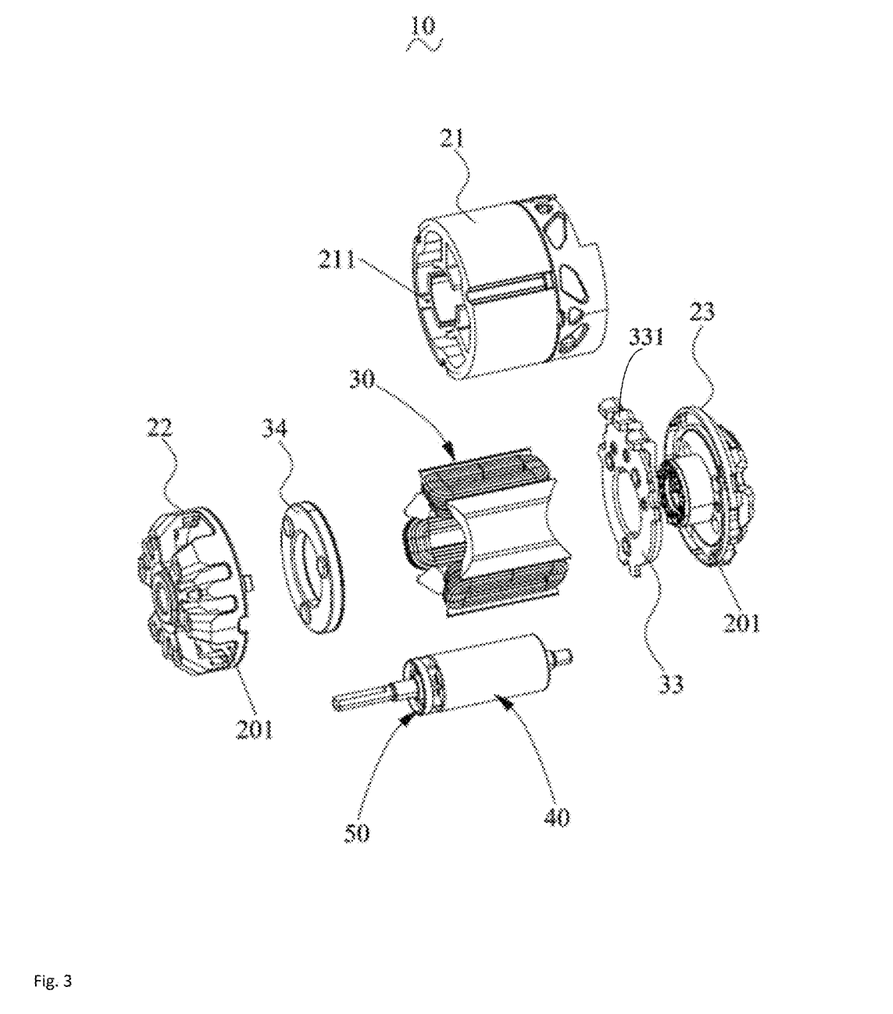
FIG. 3 is an exploded schematic diagram of the brushless motor with a self-cooling structure as shown in FIG. 1.

In this present embodiment, as shown in FIG. 3, the housing 20 includes: a protective cylinder 21, a front cover 22, and a rear cover 23, which are respectively located at both ends of the protective cylinder 21 and have ventilation holes 201. A support frame 211 is provided inside the protective cylinder 21, on which the stator assembly 30 is mounted.

The working principle of the self-cooling structure 50, in conjunction with the above structure, is as follows: when powered, the stator assembly 30 generates a magnetic field. Influenced by the magnetic force, the rotor 40 begins to rotate around the rotary shaft 41 as the central axis, and the self-cooling structure 50 rotates with it. The rotating self-cooling structure 50 stirs the air, accelerating its flow from the side of the outer cylinder 51 towards the blades 53 (as shown in FIG. 7). In other words, air is drawn in through the ventilation slot 501 of the self-cooling structure 50, passes through the end-face air intake holes 502, and is expelled through the side exhaust holes 503. The expelled airflow is directed towards the stator assembly 30, and the rapid airflow quickly carries away the heat generated by the stator assembly 30, minimizing heat accumulation. Finally, the airflow carrying heat is expelled from the housing 20 through the ventilation holes 201, thereby reducing the temperature of the stator assembly 30 and rotor 40 during operation.

It should be emphasized that the self-cooling structure 50 of this disclosure is different from the structure of a traditional fan. It is specially designed to have the following characteristics and effects:

Firstly, as shown in FIG. 6 and FIG. 7, the ventilation slot 501 and end-face air intake holes 502 are located on an end face of the self-cooling structure 50, while the side exhaust holes 503 are on its side face. This means that air is drawn in from the end face and expelled from the side face, reducing the likelihood of interference and turbulence. Moreover, after being expelled from the side exhaust holes 503, the airflow can directly blow towards the stator assembly 30.

Secondly, the several blades 53 of the self-cooling structure 50 are radially distributed, serving not only to promote air flow but also to connect the outer cylinder 51 with the inner cylinder 52.

Thirdly, as shown in FIG. 7, the outer cylinder 51 and inner cylinder 52 form the ventilation slot 501. Air must pass through the ventilation slot 501 before being drawn in through the end-face air intake holes 502. This limits the air intake range (narrowing the intake angle) compared to the wide-angle intake range of traditional fans, which is more conducive to increasing air speed and further preventing interference between intake and exhaust that could cause turbulence.

Fourthly, the self-cooling structure 50 is simple in structure and compact in size, not adding extra dimensions to the brushless motor 10, and does not change its form, making it suitable for more confined installation spaces.

Fifthly, the self-cooling structure 50 rotates with the rotor 40, eliminating the need for an additional power source. The airspeed expelled by the self-cooling structure 50 will also change autonomously with variations of the rotational speed in the rotor 40.

Preferably, the rotary shaft 41 of the rotor 40 penetrates through the front cover 22 and the rear cover 23, with bearings 60 provided between the rotary shaft 41 and the front cover 22, and between the rotary shaft 41 and the rear cover 23. The bearings 60 reduce the friction between the rotary shaft 41 and the front and rear covers, lowering energy loss and reducing heat generation. Additionally, a connecting groove 411 is provided at one end of the rotary shaft 41, facilitating connection and cooperation with other external components.

Figure 8:
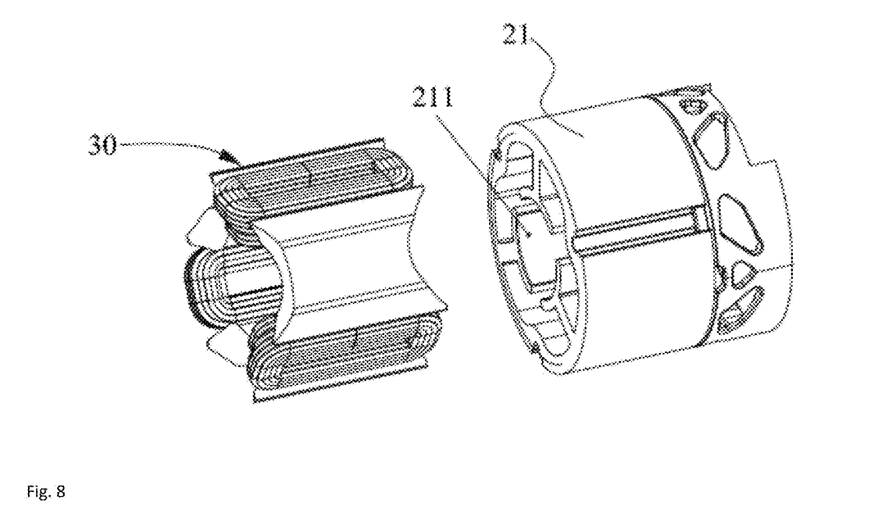
FIG. 8 is a structural schematic diagram of the protective cylinder and the stator assembly as shown in FIG. 3.
Figure 9:
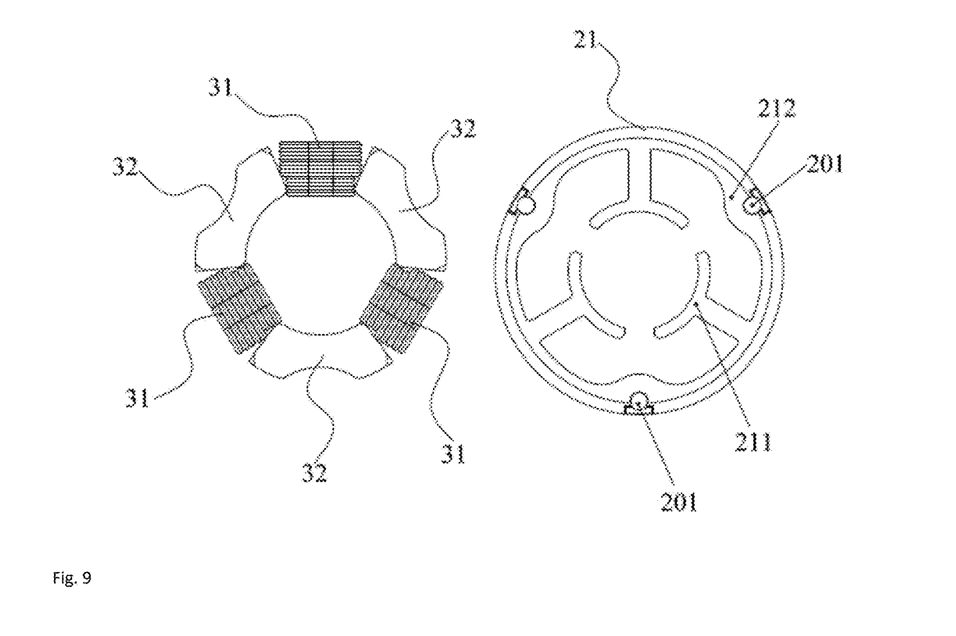
FIG. 9 is a plan view diagram of the protective cylinder and the stator assembly as shown in FIG. 8.

In this embodiment, as shown in FIG. 8 and FIG. 9, the stator assembly 30 includes multiple induction coils 31 and multiple separating blocks 32. The induction coils 31 are all mounted on the support frame 211, with a separating block 32 provided between every two adjacent induction coils 31, arranged alternately. The induction coils 31 are wound around the outer periphery of the magnetic pole induction part 42 of the rotor 40, forming a magnetic field when powered, causing the rotor 40 to rotate due to the magnetic force.

Figure 10:
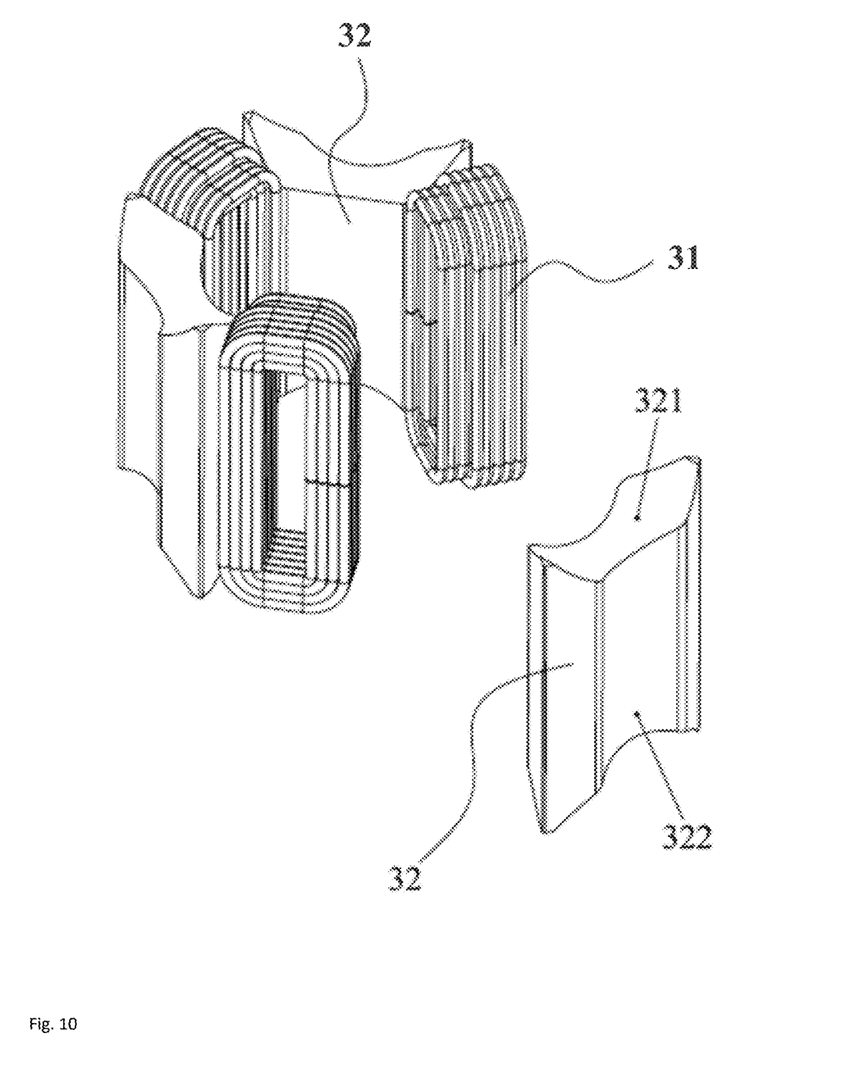
FIG. 10 is an exploded schematic diagram of the stator assembly as shown in FIG. 8.

Among them, as shown in FIG. 10, the separating block 32 has a recessed end face 321 and a concave side face 322. The recessed end face 321 is structured with an upturned edge and a recessed center. The self-cooling structure 50 is located at the recessed end face 321 on one side of the separating block 32. Moreover, the support frame 211 of the protective cylinder 21 has a retaining projection 212, which cooperates with the concave side face 322, thereby better securing the separating block 32 within the support frame 211.

Figure 11:
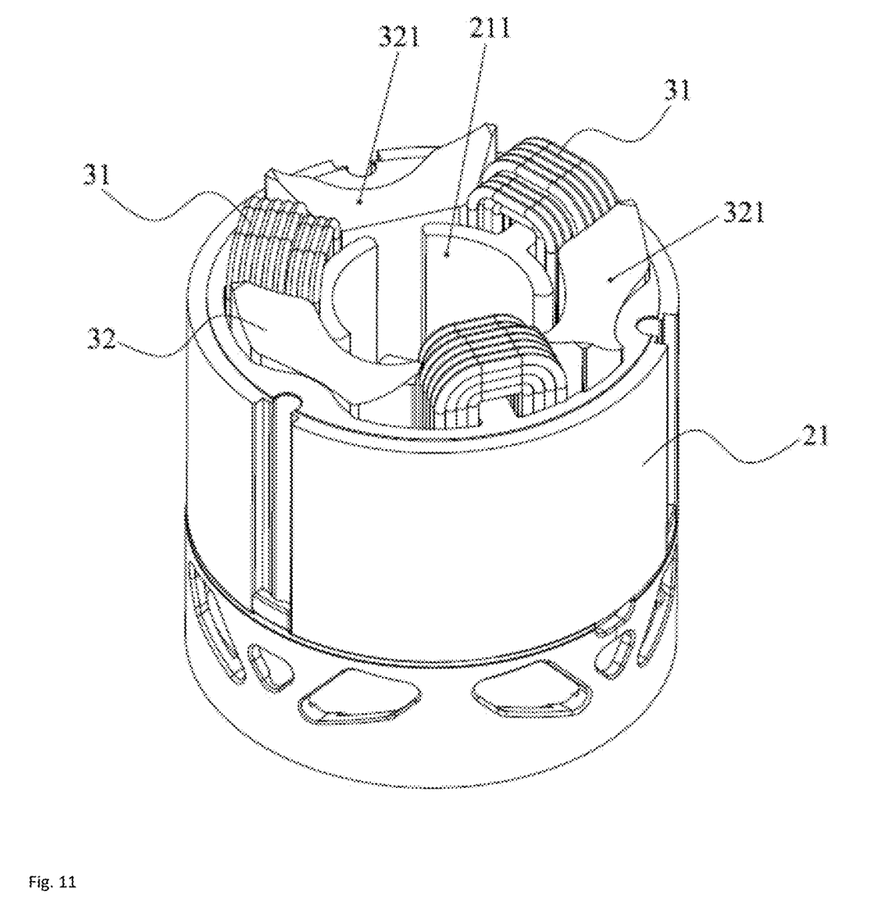
FIG. 11 is a schematic diagram of the assembly relationship between the protective cylinder and the stator assembly.

It should be emphasized that the recessed end face 321 of the separating block 32 is a special design to accommodate the use of the self-cooling structure 50:

Firstly, the separating block 32 is needed to position the induction coils 31 (as shown in FIG. 9 and FIG. 11). The side of the separating block 32 abuts against the induction coils 31, and the upturned edge of the recessed end face 321 increases the contact area between the separating block 32 and the induction coils 31.

Secondly, to avoid affecting air flow, the recessed center of the separating block 32 avoids obstructing the side exhaust holes 503 of the self-cooling structure 50 (as shown in FIG. 11), ensuring smooth airflow.

Thirdly, compared to a flat end face design, the effective area of the recessed end face 321 is larger, thus providing a greater surface area in contact with the air, resulting in better heat dissipation effects.

In one embodiment, as shown in FIG. 3, the stator assembly 30 includes a control circuit board 33, which is electrically connected to the induction coils 31. The control circuit board 33 has terminals 331, which extend to the outside of the housing 20. When powered, an external power supply line connects to the terminals 331, which then conduct electricity to the control circuit board 33 and the induction coils 31.

Preferably, as shown in FIG. 3, the stator assembly 30 also includes a clamping plate 34, which is located at one end of the induction coils 31, with the control circuit board 33 located at the other end. The clamping plate 34 and the control circuit board 33 work together to clamp the induction coils 31, with the clamping plate 34 and control circuit board 33 positioning the induction coils 31 longitudinally, and the separating block 32 positioning them transversely, ensuring that the induction coils 31 do not become loose.

Furthermore, in one embodiment, the housing 20 includes connecting bolts 24 (as shown in FIG. 1). The protective cylinder 21 has bolt holes 201, through which the connecting bolts 24 are threaded (as shown in FIG. 9). The front cover 22 and rear cover 23 are securely fastened to both ends of the protective cylinder 21 by the connecting bolts 24, with the bolt holes 201 located at the positions of the retaining projections 212. Unlike the components of the housing 20 in existing technology, which are usually connected with glue, this disclosure uses connecting bolts 24 for fixation, preventing the protective cylinder 21 from detaching from the front and rear covers, and safe guarding against high temperatures, thereby extending its service life.

In summary, the brushless motor 10 with a self-cooling structure of this disclosure is capable of actively dissipating heat within the motor without altering its form, thus reducing the motor's temperature, and enhancing its performance and service life.

The embodiments described above represent only a few examples of how this disclosure can be implemented, with a more detailed and specific description provided. However, this should not be construed as limiting the scope of the disclosure. It should be noted that for a person of ordinary skill in the art, various modifications and improvements can be made without departing from the conception of this disclosure, and these are all within the scope of protection of this disclosure. Therefore, the scope of protection of this disclosure should be determined by the appended claims.

The invention claimed is:

1. A brushless motor with a self-cooling structure, comprising: a housing, a stator assembly, a rotor, and a self-cooling structure, wherein the stator assembly is mounted on the housing, the stator assembly is fitted around the rotor, and the rotor is rotatably housed within the housing, the self-cooling structure is attached to the rotor, and the self-cooling structure is located at one end of the stator assembly, wherein the self-cooling structure comprises an outer cylinder, an inner cylinder, and a plurality of blades, wherein the plurality of blades are radially connected between an end face of the inner cylinder and an end face of the outer cylinder, a ventilation slot is formed between the outer cylinder and the inner cylinder, with multiple end-face air intake holes formed at the bottom of the ventilation slot, and side exhaust holes are formed between adjacent two blades, with the end-face air intake holes being in communication with the side exhaust holes;

wherein the rotor has a rotary shaft and a magnetic pole induction part, the self-cooling structure is fixedly fitted on the rotary shaft, and the blades of the self-cooling structure are in contact with an end face of the magnetic pole induction part;

wherein the housing comprises: a protective cylinder, a front cover, and a rear cover, wherein the front cover and the rear cover are respectively located at both ends of the protective cylinder, and ventilation holes are formed on both the front cover and the rear cover, wherein a support frame is provided inside the protective cylinder, and the stator assembly is mounted on the support frame;

wherein the stator assembly comprises a plurality of induction coils and a plurality of separating blocks, wherein the plurality of induction coils are all mounted on the support frame, and the separating block is provided between adjacent two induction coils, with the plurality of the induction coils and the plurality of the separating blocks being arranged alternately, wherein the plurality of the induction coils are wound around the outer periphery of the magnetic pole induction part of the rotor, and a magnetic field is formed by the induction coils when powered, causing the rotor to rotate under the action of the magnetic field;

wherein the separating block has a recessed end face and a concave side face, and the recessed end face is a structure with an upturned edge and a concave center, the self-cooling structure is located at the recessed end face on one side of the separating block, and the support frame has a retaining projection, which cooperates with the concave side face.

2. The brushless motor with a self-cooling structure according to claim 1, wherein the rotary shaft of the rotor penetrates through the front cover and the rear cover, and bearings are provided between the rotary shaft and the front cover, and between the rotary shaft and the rear cover, a connecting groove is provided at one end of the rotary shaft.

3. The brushless motor with a self-cooling structure according to claim 1, wherein the stator assembly comprises a control circuit board, which is electrically connected to the induction coils, and the control circuit board has terminals, which extend to the exterior of the housing.

4. The brushless motor with a self-cooling structure according to claim 3, wherein the stator assembly comprises a clamping plate, which is provided at one end of the induction coil, and the control circuit board is provided at the other end of the induction coil, with the clamping plate and the control circuit board cooperating to clamp the induction coil.

5. The brushless motor with a self-cooling structure according to claim 1, wherein the housing comprises connecting bolts, and the protective cylinder has bolt holes, with the connecting bolts passing through the bolt holes in the protective cylinder, and the front cover and the rear cover are fixedly connected to both ends of the protective cylinder by the connecting bolts, with the bolt holes being located at the position of the retaining projection.

* * * * *